United States Patent [19]
Todd

[11] Patent Number: 6,005,724
[45] Date of Patent: Dec. 21, 1999

[54] MIRROR COATING, MIRROR UTILIZING SAME, AND A MIRROR ASSEMBLY

[75] Inventor: Daniel R. Todd, Sheboygan, Wis.

[73] Assignee: K. W. Muth Company, Inc.

[21] Appl. No.: 09/166,561

[22] Filed: Oct. 5, 1998

[51] Int. Cl.$^6$ .............................. G02B 5/08; B60Q 1/26
[52] U.S. Cl. ........................ 359/884; 359/883; 362/494
[58] Field of Search ........................ 359/884, 883, 359/605, 608; 427/163.1, 164, 250, 257, 258, 271; 362/494, 540, 541

[56] References Cited

U.S. PATENT DOCUMENTS

| | | | |
|---|---|---|---|
| 32,576 | 1/1861 | Pastore | 350/600 |
| 1,456,950 | 5/1923 | Switch . | |
| 2,060,401 | 11/1936 | Smith | 177/329 |
| 2,180,610 | 11/1939 | Ritz-Woller | 240/4.2 |
| 2,190,123 | 2/1940 | Pace | 177/329 |
| 2,263,382 | 11/1941 | Gotzinger | 177/329 |
| 2,580,014 | 12/1951 | Gazda | 177/329 |
| 2,595,331 | 5/1952 | Calihan et al. | 177/329 |
| 3,040,207 | 6/1962 | Grontkowski | 315/77 |
| 3,266,016 | 8/1966 | Maruyama et al. | 340/98 |
| 3,436,758 | 4/1969 | Kluth | 340/376 |
| 3,449,626 | 6/1969 | De Coye De Castelet | 315/77 |
| 3,532,871 | 10/1970 | Shipman | 240/7.1 |
| 3,543,018 | 11/1970 | Barcus et al. | 240/4.2 |
| 3,665,392 | 5/1972 | Annas | 340/67 |
| 3,840,851 | 10/1974 | Fowler et al. | 340/74 |
| 4,005,928 | 2/1977 | Kmetz et al. | 350/160 |
| 4,023,029 | 5/1977 | Fischer | 240/4.2 |
| 4,040,726 | 8/1977 | Paca | 350/288 |
| 4,066,332 | 1/1978 | Kato et al. | 350/126 |
| 4,158,483 | 6/1979 | Fisher et al. | 350/289 |
| 4,274,078 | 6/1981 | Isobe et al. | 340/98 |
| 4,299,444 | 11/1981 | Romer | 350/278 |
| 4,443,057 | 4/1984 | Bauer et al. | 350/281 |
| 4,463,411 | 7/1984 | Proctor | 362/61 |
| 4,475,100 | 10/1984 | Duh | 340/98 |
| 4,479,172 | 10/1984 | Connor | 362/135 |
| 4,491,390 | 1/1985 | Tong-Shen | 350/331 |
| 4,499,451 | 2/1985 | Suzuki et al. | 340/98 |
| 4,506,315 | 3/1985 | Maekawa et al. | 362/308 |
| 4,516,197 | 5/1985 | Yonkers | 362/342 |
| 4,583,155 | 4/1986 | Hart | 362/285 |
| 4,588,267 | 5/1986 | Pastore | 350/600 |
| 4,591,954 | 5/1986 | Kawamura et al. | 362/61 |
| 4,603,946 | 8/1986 | Kato et al. | 350/331 |
| 4,613,791 | 9/1986 | Kurihara et al. | 315/82 |
| 4,623,222 | 11/1986 | Itoh et al. | 350/331 |
| 4,626,967 | 12/1986 | Segoshi | 362/61 |
| 4,630,904 | 12/1986 | Pastore | 350/600 |
| 4,646,210 | 2/1987 | Skogler et al. | 362/142 |
| 4,659,967 | 4/1987 | Dahl | 315/307 |
| 4,665,321 | 5/1987 | Chang et al. | 307/10 |
| 4,701,022 | 10/1987 | Jacob | 350/278 |
| 4,721,364 | 1/1988 | Itoh et al. | 350/332 |
| 4,733,335 | 3/1988 | Serizawa et al. | 362/80 |
| 4,733,336 | 3/1988 | Skogler et al. | 362/142 |
| 4,791,534 | 12/1988 | Lindberg | 362/80 |
| 4,793,690 | 12/1988 | Gahan et al. | 350/279 |
| 4,799,768 | 1/1989 | Gahan | 350/279 |
| 4,807,096 | 2/1989 | Skogler et al. | 362/142 |

(List continued on next page.)

FOREIGN PATENT DOCUMENTS

| | | |
|---|---|---|
| 1141966 | 8/1971 | Australia . |
| 268359 | 7/1927 | United Kingdom . |
| 1172382 | 11/1969 | United Kingdom . |

*Primary Examiner*—Cassandra Spyrou
*Assistant Examiner*—Mohammad Y. Sikder
*Attorney, Agent, or Firm*—Wells, St. John, Roberts, Gregory & Matkin, P.S.

[57] ABSTRACT

A mirror, mirror coating utilized with same, and mirror assembly are described and wherein the mirror coating has a primary region which reflects visibly discernible electromagnetic radiation, and a secondary region or multiple secondary regions which passes a portion of the visibly discernible electromagnetic radiation while simultaneously reflecting a given percentage of the visibly discernible electromagnetic radiation, and wherein the average reflectance of the entire surface is greater than about 50%.

22 Claims, 4 Drawing Sheets

U.S. PATENT DOCUMENTS

| | | | |
|---|---|---|---|
| 4,841,198 | 6/1989 | Wilhelm | 315/82 |
| 4,862,330 | 8/1989 | Machida et al. | 362/61 |
| 4,868,459 | 9/1989 | Dennerlein et al. | 315/158 |
| 4,868,719 | 9/1989 | Kouchi et al. | 362/61 |
| 4,882,565 | 11/1989 | Gallmeyer | 340/461 |
| 4,886,960 | 12/1989 | Molyneux et al. | 250/209 |
| 4,893,063 | 1/1990 | Pernyeszi | 315/307 |
| 4,916,430 | 4/1990 | Vu et al. | 340/463 |
| 4,917,477 | 4/1990 | Bechtel et al. | 350/357 |
| 4,929,866 | 5/1990 | Murata et al. | 313/500 |
| 4,935,665 | 6/1990 | Murata | 313/500 |
| 4,951,179 | 8/1990 | Machida | 362/61 |
| 5,014,167 | 5/1991 | Roberts | 362/83.1 |
| 5,029,060 | 7/1991 | Aho et al. | 362/299 |
| 5,050,051 | 9/1991 | Machida et al. | 362/80.1 |
| 5,059,015 | 10/1991 | Tran | 359/844 |
| 5,072,340 | 12/1991 | Jones | 362/80 |
| 5,093,768 | 3/1992 | Ohe | 362/241 |
| 5,097,395 | 3/1992 | Aho et al. | 362/32 |
| 5,150,966 | 9/1992 | Nelson | 362/337 |
| 5,165,772 | 11/1992 | Wu | 362/26 |
| 5,174,649 | 12/1992 | Alston | 362/244 |
| 5,207,492 | 5/1993 | Roberts | 362/30 |
| 5,211,466 | 5/1993 | Jarocki et al. | 362/83.3 |
| 5,241,457 | 8/1993 | Sasajima et al. | 362/80.1 |
| 5,272,602 | 12/1993 | Sasajima et al. | 362/80.1 |
| 5,285,060 | 2/1994 | Larson et al. | 250/214 |
| 5,303,130 | 4/1994 | Wei et al. | 362/83.1 |
| 5,355,284 | 10/1994 | Roberts | 362/30 |
| 5,361,190 | 11/1994 | Roberts et al. | 362/61 |
| 5,371,659 | 12/1994 | Pastrick et al. | 362/83.1 |
| 5,388,035 | 2/1995 | Bodem, Jr. | 362/61 |
| 5,402,103 | 3/1995 | Tashiro | 340/475 |
| 5,404,869 | 4/1995 | Parkyn, Jr. et al. | 126/699 |
| 5,436,741 | 7/1995 | Crandall | 359/15 |
| 5,436,809 | 7/1995 | Brassier et al. | 362/61 |
| 5,438,487 | 8/1995 | Schmid et al. | 362/61 |
| 5,481,409 | 1/1996 | Roberts | 359/839 |
| 5,497,305 | 3/1996 | Pastrick et al. | 362/83.1 |
| 5,497,306 | 3/1996 | Pastrick | 362/83.1 |
| 5,528,422 | 6/1996 | Roberts | 359/583 |
| 5,530,240 | 6/1996 | Larson et al. | 250/214 AL |
| 5,587,699 | 12/1996 | Faloon et al. | 340/475 |
| 5,788,357 | 8/1998 | Muth et al. | 362/83.1 |
| 5,879,074 | 3/1999 | Pastrick | 362/494 |

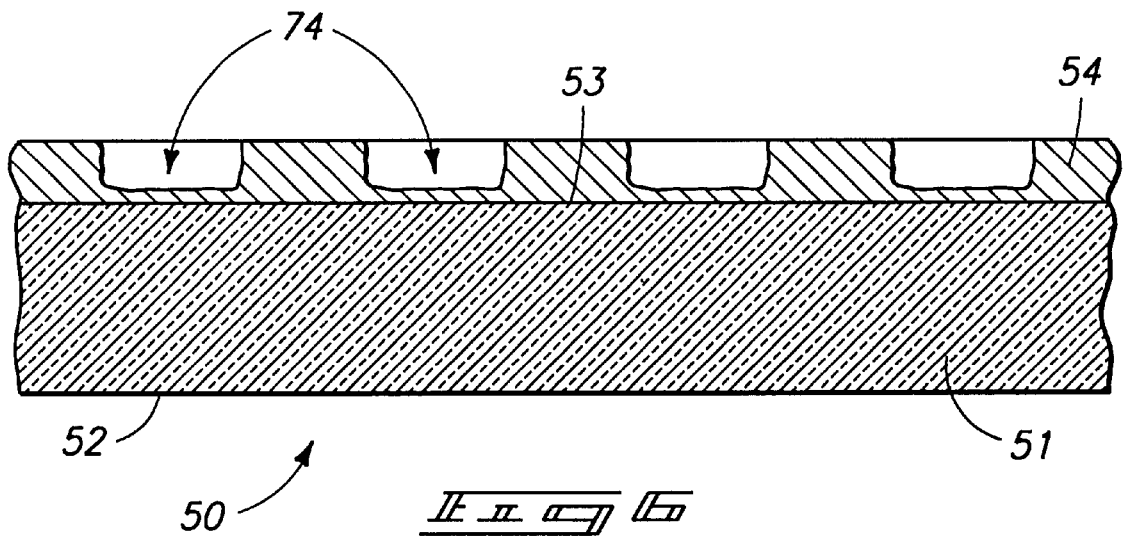
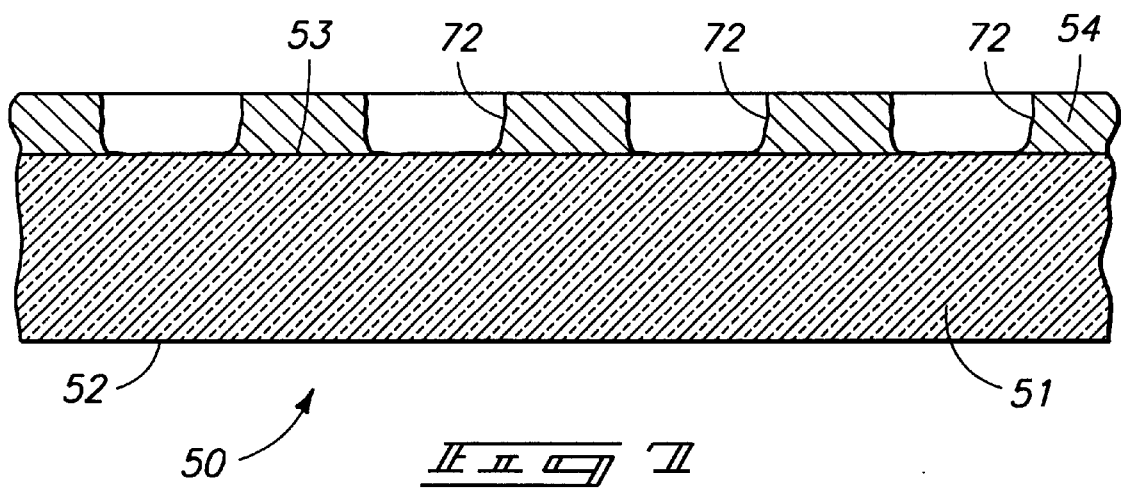

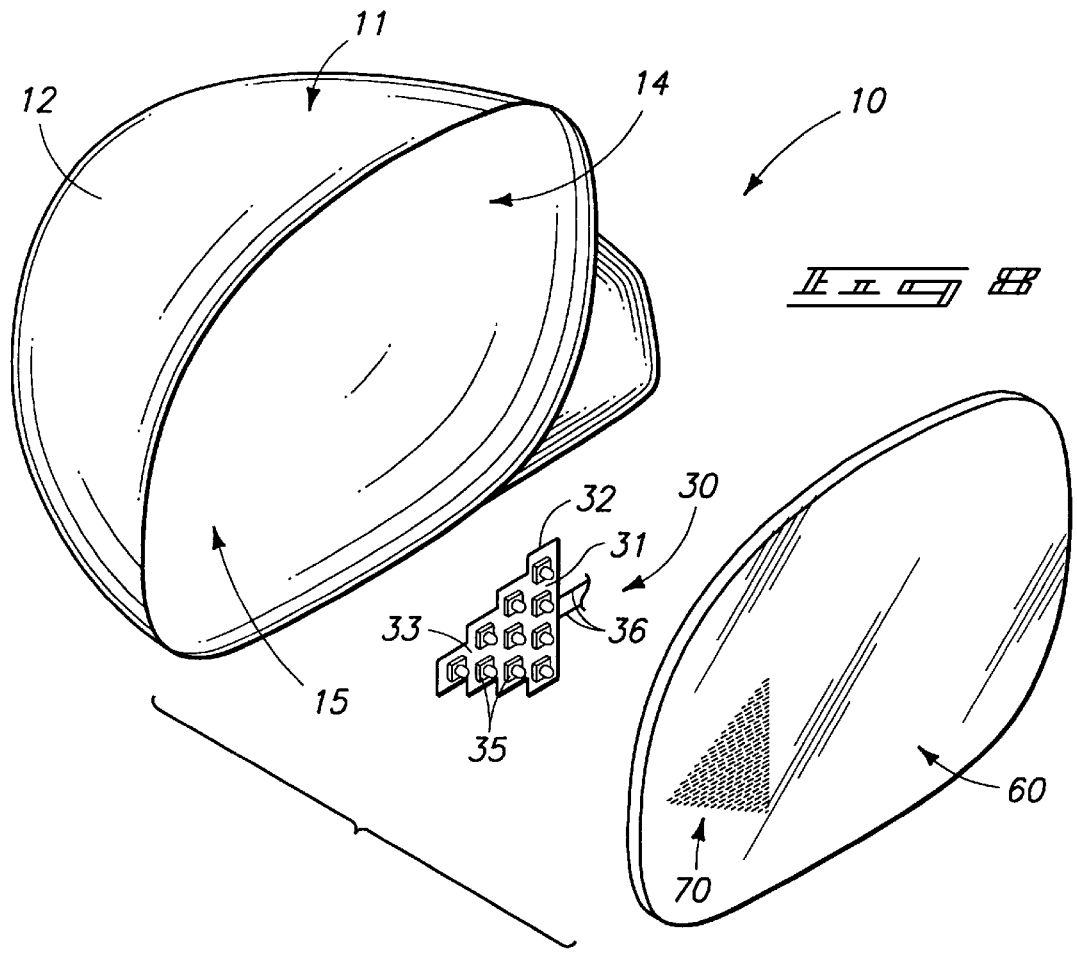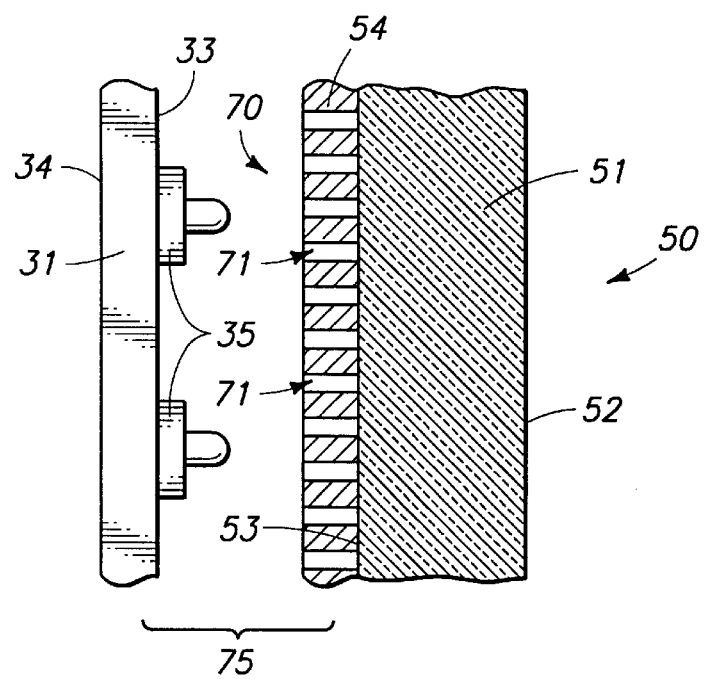

MIRROR COATING, MIRROR UTILIZING SAME, AND A MIRROR ASSEMBLY

TECHNICAL FIELD

The present invention relates to a mirror coating, mirror employing same and a mirror assembly, and more particularly to an invention which finds utility when coupled with the controls of an overland vehicle of the like, and which may, on the one hand, and in one form of the invention, operates as a combined warning lamp and rear view mirror assembly.

DESCRIPTION OF THE PRIOR ART

The beneficial effects of employing auxiliary signaling assemblies have been disclosed in various United States patents, including U.S. Pat. Nos. 5,014,167; 5,207,492; 5,355,284; 5,361,190; 5,481,409; and 5,528,422, all of which are incorporated by reference herein. The mirror assemblies disclosed in the above-captioned patents employ a dichroic mirror which is operable to reflect a broad band of electromagnetic radiation, within the visible light portion of the spectrum, while simultaneously permitting electromagnetic radiation having wavelengths which reside within a predetermined spectral band to pass therethrough. In this fashion, the dichroic mirror remains an excellent visual image reflector, that is, achieving luminous reflectance which is acceptable for automotive and other industrial applications, for example, while simultaneously achieving an average transmittance in the predetermined spectral band of at least 58%. Further, when the predetermined band pass region is relatively narrow, that is, such as 30 nanometers or more, average in-band transmittance of 80% or more can be achieved with peak transmittance in excess of 90% being common.

In U.S. Pat. No. 5,528,422, a plurality of mirror coatings were disclosed and which are operable to conceal an underlying sensor or light-emitting assembly while simultaneously providing a neutral chromatic appearance. These same mirror coatings simultaneously absorb wavelengths of electromagnetic radiation which may otherwise be transmitted into the mirror assembly and which would, over time, degrade or otherwise be harmful to the subassembly which is concealed by the mirror assembly.

In still another reference, U.S. Pat. No. 5,788,357, a mirror assembly is disclosed and which includes a semitransparent nondichroic mirror which passes 8% or less of substantially all visible light, and which reflects about 35% to about 85% of a broad band of visible light; and a light assembly which emits visible light which is passed by the semitransparent mirror, the luminous intensity to the mirror assembly being about 2 to about 20 candelas. The teachings of this reference are incorporated by reference herein.

While the devices disclosed in these patents have realized some degree of commercial success, certain inherent physical characteristics of the earlier disclosed mirror assemblies have somewhat impeded manufacturing efforts to cost-effectively mass produce these same assemblies. For example, while the mirror coatings disclosed in U.S. Pat. No. 5,528,422 operate as described, the manufacturing difficulties and costs associated with producing these rather complex coatings with commercially available coating fabrication equipment has impeded the introduction of low cost products for the mass market. Similar difficulties have hampered the introduction of products fabricated in accordance with the teaching of U.S. Pat. No. 5,788,357. Yet further, as the size of mirror housings have decreased in volume as a result of the recent automotive platform design changes, the amount of available space within these same housings has become quite limited. Therefore, the size and weight of the enclosed light-emitting assembly or sensor has become a factor in the commercial introduction of a suitable product.

Other devices have attempted to diverge from the teachings provided in the patents noted above. These devices, however, when built in accordance with their teachings, have been unable to provide the same performance characteristics. An example of such prior art is the patent to Crandall, U.S. Pat. No. 5,436,741. Other prior art references describe devices which attempt to provide the same functional benefits, as described in the earlier patents. These references describe all manner of mirror housing modifications, where for example, lamps are located in various orientations to project light into predetermined areas both internally, and\or besides the overland vehicle, and to further provide auxiliary signaling or warning capability. Examples of such U.S. Pat. Nos. include 4,583,155; 4,646, 210; 4,916,430; 5,059,015; 5,303,130; 5,371,659; 5,402, 103; and 5,497,306 to name but a few.

Other prior art references have attempted to provide a combined mirror and signaling assembly. These assemblies have employed a nondichroic, semitransparent mirror. Perhaps the earliest and most germane patent which discloses this type of assembly is the patent to Maruyama et al U.S. Pat. No. 3,266,016. This reference was however devoid of any suggestion of how one would manufacture a device which would have both an acceptable reflectivity, and an acceptable luminous output, while simultaneously avoiding the detriments associated with the build up, and accumulation of heat within the mirror housing, and further being functional within the limited spacial area provided for by the same mirror housing. Similar problems are evident in the U.S. Pat. No. to Gotzinger, 2,263,382, which discloses a mirror signal device. This device includes a mirror mounted in a bell or housing which contains an electric lamp. The mirror has a transparent backing or silvering which becomes non-reflecting when illuminated from behind. The invention permits light to pass only through a lighted area of the mirror in the form of a signal or symbol. This is done by means of a stencil in the back of the mirror, and may be further enhanced by a colored transparency.

To a limited extent, the reference to Muth et al., U.S. Pat. No. 5,788,357, addresses some of the apparent or perceived problems of utilizing a semitransparent nondichroic mirror in a mirror assembly as described above. However, and as noted above, the manufacturing problems associated with producing a cost-effective semitransparent coating within the operational parameters as discussed in that same patent has impaired its successful commercial introduction.

In the present invention, the inventor has departed from the teachings of the prior art, noted above, by providing, in one aspect, a mirror coating which has a primary region which reflects visibly discernible electromagnetic radiation, and a secondary region which passes a portion of the visibly discernible electromagnetic radiation while simultaneously reflecting a given percentage of the visibly discernible electromagnetic radiation, and wherein the average reflectance of the mirror coating is greater than about 50%. In the preferred form of the invention, the primary region reflects less than about 80% of the given band of visibly discernable electromagnetic radiation and the secondary region reflects at least about 35% of the same given band of electromagnetic radiation, the mirror employing the mirror coating having an average reflectance of at least about 50%. The mirror as described, may be utilized in a mirror assembly which includes about 1 to about 30 light emitting diodes and which are positioned adjacent to the secondary region. These light emitting diodes, when energized, have a cumulative luminous output of about 1 to about 1000 candelas and the luminous output of the secondary region is about 0.5 to about 120 candelas.

OBJECTS AND SUMMARY OF THE INVENTION

Therefore, one aspect of the present invention is to provide an improved mirror coating, mirror utilizing same, and mirror assembly.

Another aspect of the present invention is to provide a mirror assembly which may be manufactured and installed as original equipment on an overland vehicle or the like or which may be further manufactured in the manner of a retrofit and substantially equivalent to an original equipment installation.

Another aspect of the present invention is to provide a mirror which may be readily installed or integrated with other mirror technologies, such as motorized actuators, heater films, and films of various types, including diffractive, holographic, reflective, and electrochromic devices of various designs.

Another aspect of the present invention is to provide a mirror which has a primary region which is substantially opaque, and wherein the mirror further has a secondary region which has a given surface area which is about 1% to about 80% of the surface area of the primary region.

Another aspect of the present invention is to provide a mirror which has a secondary region which comprises a mirror coating having a plurality of individual apertures having given cross sectional areas formed therein, and wherein the cumulative cross sectional areas of the individual apertures comprise less than about 60% of the surface area of the secondary region.

Another aspect of the present invention is to provide a mirror which has a secondary region which passes about 1% to about 80% of the visibly discernible electromagnetic radiation directed at same.

Another aspect of the present invention is to provide in one form of the invention, a mirror assembly which includes an electromagnetic radiation emitter positioned adjacent to the secondary region of the mirror, and which emits visible light which is passed by the secondary region, the luminous output of the secondary region of the mirror being about 0.5 to about 120 candelas.

Another aspect of the present invention is to provide in one form of the invention, a mirror assembly which includes an electromagnetic radiation emitter positioned adjacent to the secondary region of the mirror, and which has a luminous output of about 1 candela to about 1000 candelas.

Yet still another aspect of the present invention is to provide a mirror assembly having a secondary region which has a light emitting surface area of about 10 to about 4000 millimeters.

Yet further, another aspect of the present invention is to provide a mirror assembly which is operable to obtain the individual benefits to be derived from related prior art assemblies and devices while avoiding the detriments individually associated therewith.

Further aspects and advantages of the present invention are to provide improved elements and arrangements thereof in a mirror, mirror coating utilized with same, and mirror assembly for the purposes described, and which is dependable, economical, durable, and fully effective in accomplishing these intended purposes.

These and other aspects and advantages are achieved in a mirror coating which comprises a primary region which reflects visibly discernible electromagnetic radiation, and a secondary region which passes electromagnetic radiation while simultaneously reflecting a given percentage of visibly discernible electromagnetic radiation.

BRIEF DESCRIPTION OF THE DRAWINGS

Preferred embodiments of the invention are described below with reference to the following accompanying drawings.

FIG. 6 is a partial, vertical sectional view of the mirror and which is taken along lines 6—6 of FIG. 2.

FIG. 7 is a greatly enlarged, vertical sectional view of the mirror taken from a position along line 6—6 of FIG. 2, and which illustrates an alternative form from that shown in FIG. 6.

FIG. 8 is an exploded, perspective view of a mirror assembly of the present invention.

FIG. 9 is a greatly enlarged, fragmentary, vertical sectional view taken from a position along line 6—6 of FIG. 2, and showing a light emitting assembly utilized with same. The proportional relationship of this drawing is greatly exaggerated in order to facilitate an understanding of the invention.

BRIEF DESCRIPTION OF THE PREFERRED EMBODIMENTS

Figure 1:
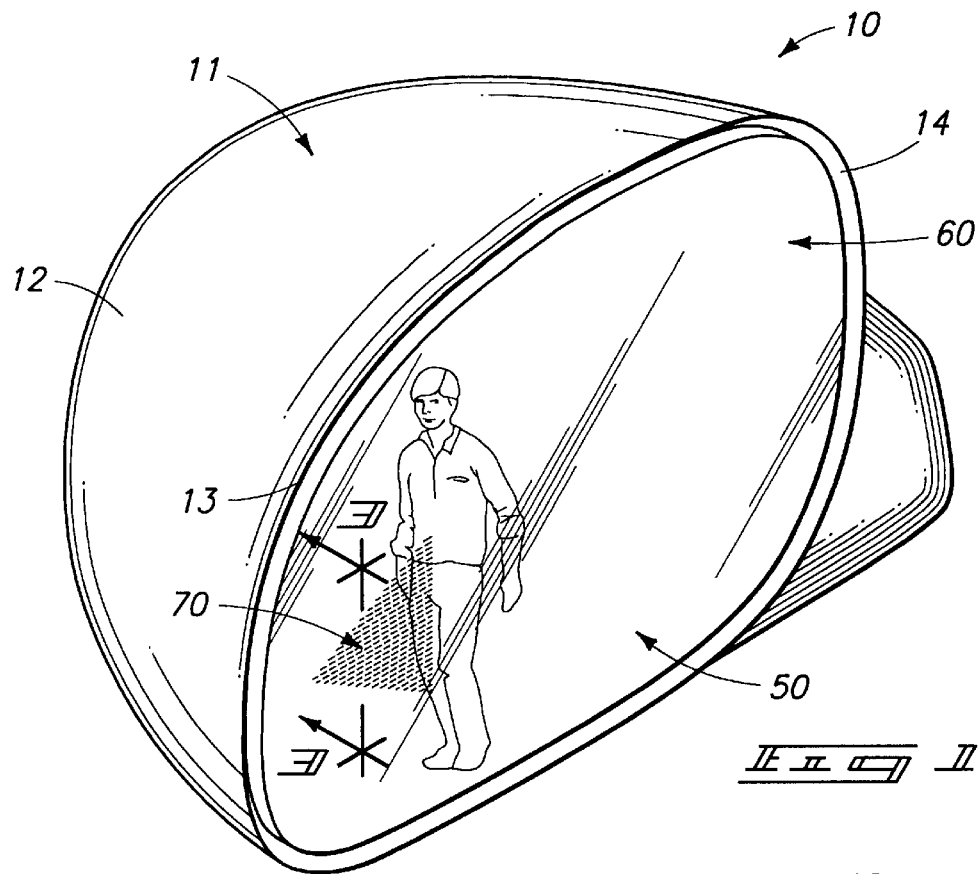
FIG. 1 is a perspective, front elevation view of a mirror assembly of the present invention in a deenergized state.
Figure 2:
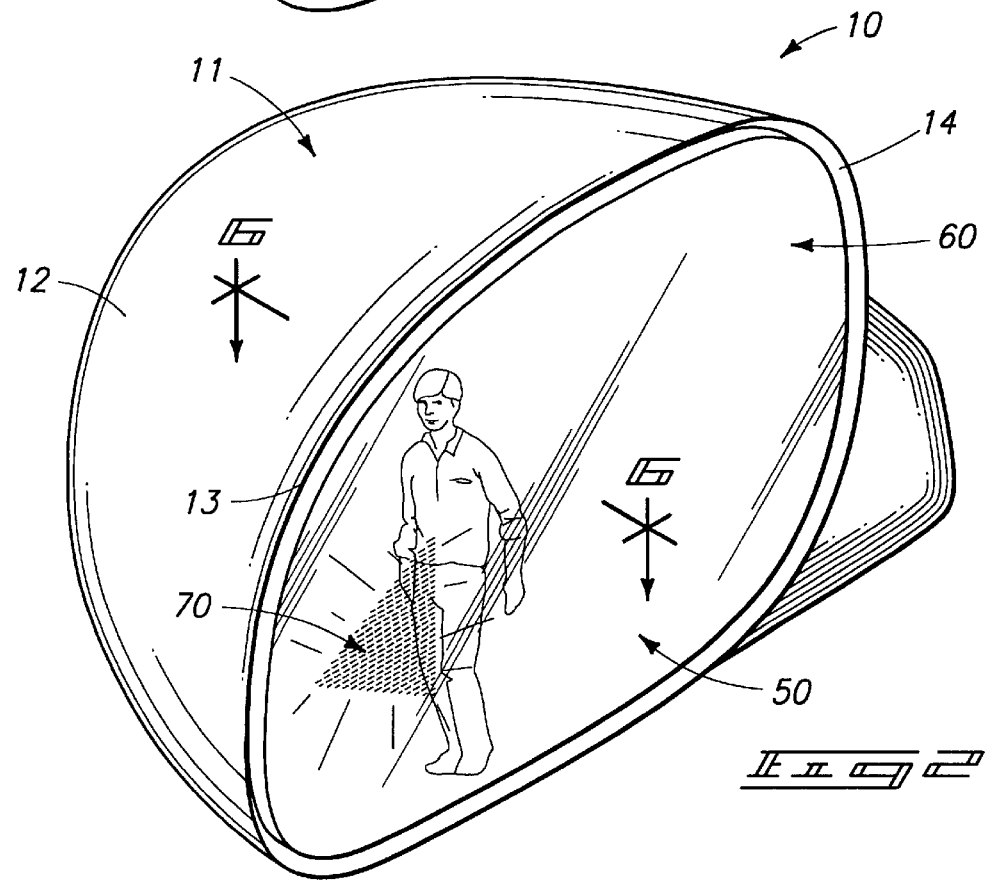
FIG. 2 is a perspective, front elevation view of a mirror assembly of the present invention in an energized state.

A mirror assembly which utilizes a mirror, and mirror coating of the present invention, is best indicated by the numeral 10 in FIGS. 1, 2, and 8, respectively. As shown therein, the mirror assembly 10 includes a mirror housing 11 which has a substantially continuous sidewall 12. The continuous sidewall has a peripheral edge 13 which defines an aperture 14 (FIG. 8) of given dimensions. Further, this substantially continuous sidewall defines a cavity 15. It should be understood that the mirror housing is mounted on an overland vehicle of conventional design (not shown). The housing will be placed within the line of sight of an operator in a position normally occupied by an exterior rear view mirror. However, it should be understood that the present device is not limited to use on overland vehicles, but may be used in all manner of industrial applications, including signs, and various visual displays.

As seen in FIG. 8, enclosed within the cavity 15 is a light emitting assembly which is designated by the numeral 30. The light emitting assembly includes a supporting, substantially nonconductive substrate 31 which is defined by a peripheral edge 32. The supporting substrate has a forward facing surface 33 and an opposite rearward facing surface 34. Conductive traces, not shown, may be formed on either the forward or rearward facing surfaces, more commonly the forward facing surface 33. The conductive traces are electrically coupled with a plurality of light emitting diodes 35 which are affixed on the forward facing surface 33. The conductive traces which are formed on either the forward or rearward facing surfaces 33 or 34 are electrically coupled to an automotive or other electrical system by means of the electrical leads 36. As should be understood, the supporting substrate 31 provides a light emitting surface area of about 10 to about 4000 square millimeters. Of course, the surface area of the nonconductive substrate is typically larger than this. Further, about 1 to about 30 light emitting diodes are mounted on the supporting substrate and may be placed in a given geometrical pattern such as a triangle as shown, or other patterns based upon the ultimate end use. The supporting substrate 31, and the light emitting diodes 35 have a combined weight of normally less than about 100 grams when used in automotive applications. Further, it should be understood that the light emitting diodes when energized, emit visibly discernible electromagnetic radiation or other substantially invisible radiation. The luminous output of the about 1 to about 30 light emitting diodes 35 is about 0.5 to about 1000 candelas. As seen from a study of FIG. 8, the substrate and related light emitting diodes are formed generally or roughly into the shape of a triangle or pyramid-like shape, but any alpha-numeric designation or geometric or fanciful shape may be formed and which could be viewed from a position exterior to the mirror housing 11. Further, all manner of different optical assemblies may be utilized in combination with the light emitting diodes 35 to collimate, reflect, or otherwise direct the light emitted from same in a given direction, pattern, or intensity of distribution relative to the supporting substrate. Such is disclosed in the earlier prior art patents which are incorporated by reference herein.

A mirror 50 is disposed in substantially occluding relation relative to the aperture 14 which is defined by the mirror housing 11. The mirror 50 comprises a supporting substantially transparent substrate 51 which has a forward facing surface 52, and an opposite rearward facing surface 53, (FIG. 9). A mirror coating 54 (FIGS. 6 and 7) is applied on the rearwardly facing surface 53. As should be understood, the mirror coating may be applied in an alternative form to the forward facing surface. The discussion which follows, therefore, is applicable to mirrors where the mirror coating is applied to either the forward or rearward facing surfaces. The mirror coating 54 may comprise any number of different, highly reflective or mirror-like coatings or substances such as chromium or the like, and which may be applied in a manner which provides a commercially acceptable reflective surface. As best seen by reference to FIGS. 1 and 2, the mirror 50 has a primary region 60, and an adjacent secondary region 70. While only two regions are shown it is possible, of course, to have a plurality of secondary regions as operational conditions may dictate. As a general matter, the primary region 60 reflects visibly discernible electromagnetic radiation and is nominally opaque, and the secondary region 70 passes a portion of the visibly discernible electromagnetic radiation directed at same while simultaneously reflecting a given percentage of the visibly discernible electromagnetic radiation. The average reflectance of the overall mirror coating 54, including both the primary and secondary regions is greater than about 50% when employed for automotive applications. In other industrial applications, the average reflectance may be lower or higher, depending upon the desired end-use. As seen in the drawings, the primary region 60 is substantially continuous, and reflects, for automotive applications, less than about 80% of the visibly discernible electromagnetic radiation striking this portion of the overall mirror 50 surface area. The primary and secondary regions each have a given surface area. Still further, the primary region 60 passes on average less than about 1% of the visibly discernible electromagnetic radiation striking its surface, and the secondary region passes about 1% to about 65% of the same visibly discernible electromagnetic radiation. In the preferred form of the invention, the secondary region reflects at least about 35% of the visibly discernible electromagnetic radiation striking its surface. These ranges have been found suitable for automotive applications, however, other broadened or narrowed ranges may be useful for other industrial applications.

Figure 3:
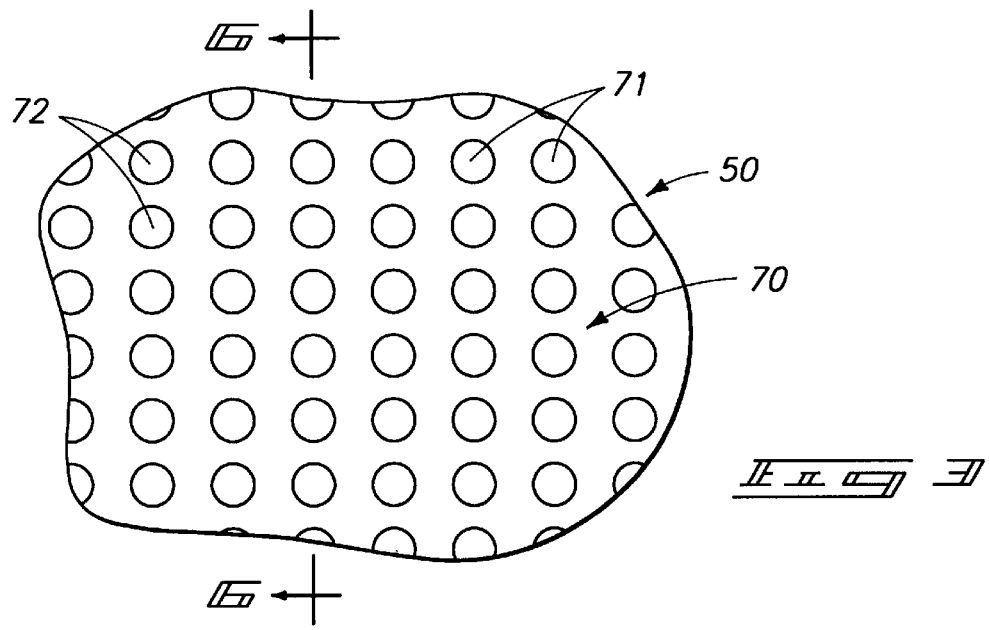
FIG. 3 is a greatly enlarged, partial, plan view taken from a position along line 3—3 of FIG. 1.
Figure 4:
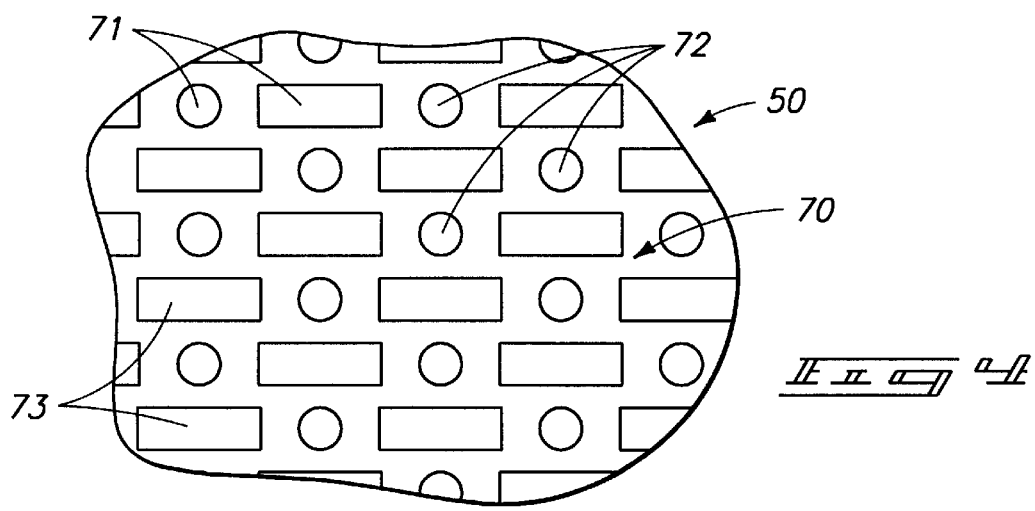
FIG. 4 is a greatly enlarged, partial, plan view taken from a position along line 3—3 of FIG. 1, and showing an alternative arrangement to that shown in FIG. 3.
Figure 5:
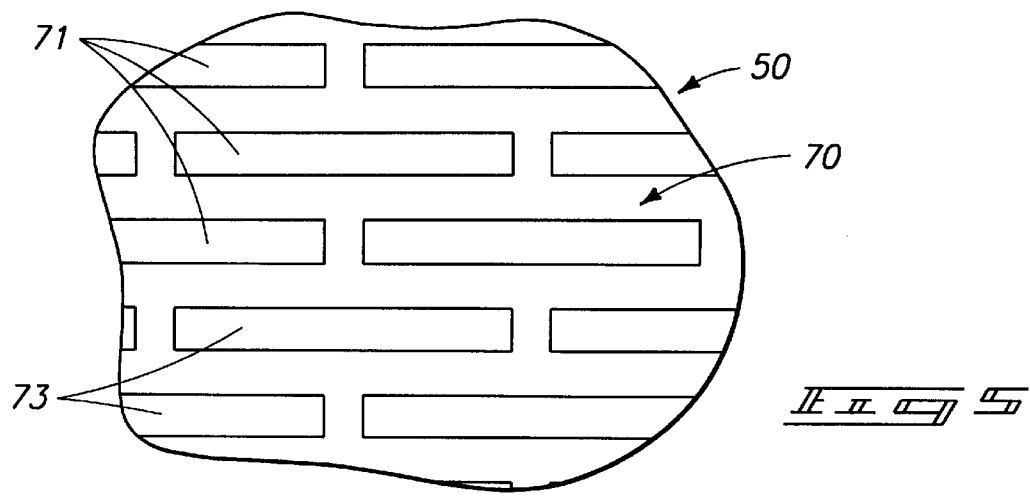
FIG. 5 is a greatly enlarged, partial, plan view taken from a position along line 3—3 of FIG. 1, and showing still further an alternative arrangement to that shown in FIGS. 3 and 4.

As best seen by reference to FIGS. 3, 4, and 5, the mirror coating 54 in the secondary region 70, of the mirror 50 includes a plurality of discrete apertures 71 which may be formed in a number of given patterns and in various densities. As seen in FIGS. 7 and 9, which are greatly exaggerated representations of the invention, the plurality of discrete apertures 71 extend substantially through the coating to the surface 53 of the transparent substrate 51. In an alternative form of the invention, as shown in FIG. 6, reduced thickness areas 74 may be formed in the mirror coating, it being understood that the reduced thickness areas 74 allow visible electromagnetic radiation to pass therethrough to a greater extent then the adjacent thicker areas. Such reduced thickness areas might be achieved by means of laser oblation, chemical mechanical polishing, and other similar techniques.

The plurality of discrete apertures 71 as formed in the mirror surface, may comprise round apertures 72 (FIG. 3); elongated apertures 73 (FIG. 5); or mixtures thereof (FIG. 4). Such mixtures of aperture shapes may also include continuous lines or other geometric patterns which may or may not be symmetrical in either the shape of the apertures or the overall distribution or location of the apertures. The discrete apertures 71 have a given cross-sectional area. In particular, the cumulative cross-sectional areas of the given apertures is less than about 60% of the surface area of the secondary region 70. When the discrete apertures which are selected are substantially round 72, the given apertures have a diametral dimension of about 0.001 millimeters to about 0.015 millimeters. Still further, the round apertures 72 are spaced apart about 0.005 millimeters to about 0.05 millimeters when measured center-to-center. As seen in FIG. 9, the mirror 50, including the mirror coating 54, and the light emitting assembly 30 comprise an optical stack 75, which has a thickness of less than about 25 millimeters. When assembled, the resulting optical stack, when energized, creates less than about 18 milliwatts of heat energy per square millimeter of surface area of the substrate 31, and further, the light emitting diodes 35 emit visibly discernible electromagnetic radiation which is passed by the secondary region such that the secondary region has a luminous output of about 0.5 to about 120 candelas. Such is best illustrated in FIG. 2. As best seen by a comparison between FIGS. 1 and 2, the primary region 60 of the mirror 50 is an excellent reflector of visible electromagnetic radiation. Further, the secondary region 70 while it has been rendered operable to transmit electromagnetic radiation, remains an acceptable reflector such that an image can be perceived in same while electromagnetic radiation passes therethrough. Still further, the distribution and size of the apertures in the secondary region permits the easy adjustment of the reflective and transmission valves for this same region to produce a predetermined luminous output for specific industrial applications.

OPERATION

The operation of the described embodiments of the present invention are believed to be readily apparent and are briefly summarized at this point.

A first aspect of the present invention relates to a mirror coating comprising a primary region 60 which reflects visibly discernible electromagnetic radiation, and a secondary region 70 which passes a portion of the visibly discernible electromagnetic radiation while simultaneously reflecting a given percentage of the visibly discernible electromagnetic radiation. The average reflectance of the entire mirror coating is greater than about 50%.

A further aspect of the present invention relates to a mirror 50 comprising a supporting substrate 51 having opposite surfaces 52 and 53 respectively; and a mirror coating 54 disposed on one of the surfaces of the substrate, and wherein the mirror coating 54 defines a primary region 60 which reflects less than about 80% of a given band of visibly discernible electromagnetic radiation, and a secondary region 70 through which electromagnetic radiation may pass, and wherein the secondary region 70 reflects at least about 35% of the same given band of electromagnetic radiation.

Yet a further aspect of the present invention relates to a mirror assembly 10 comprising a substantially transparent substrate 51 having opposite surfaces 52 and 53 respectively, and a given surface area; a mirror coating 54 disposed on one of the surfaces of the substantially transparent substrate 51, and wherein the mirror coating 54 defines a primary region 60 which reflects less than about 80 of a given band of visibly discernible electromagnetic radiation, and a secondary region 70 through which electromagnetic radiation may pass. The secondary region 70 comprises about 1% to about 80% of the surface area of the substantially transparent substrate 51. Further, the secondary region 70 reflects at least about 35% of the same given band of visibly discernible electromagnetic radiation. The secondary region 70 is defined by a plurality of discrete apertures 71 which are formed in the mirror coating 54. Further, the mirror assembly 10 comprises about 1 to about 30 light emitting diodes 35 which are positioned adjacent to the secondary region 70, and which, when energized, have a cumulative luminous output of about 1 to about 1000 candelas. Further, the luminous output of the secondary region is about 0.5 to about 120 candelas.

As noted above, the plurality of discrete apertures 71 may be formed by all manner of techniques including laser oblation, chemical mechanical polishing, and other techniques. The average reflectance of the overall mirror 50, however, remains, on average, at least about 50%; and the average luminous reflectance of the secondary region 71 is at least about 35%, and its average transmittance is at least about 1% to about 65%.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A mirror coating comprising:
   a primary region which reflects visibly discernible electromagnetic radiation, and a secondary region which passes a portion of the visibly discernible electromagnetic radiation while simultaneously reflecting a given percentage of the visibly discernible electromagnetic radiation, and wherein the average reflectance of the mirror coating is greater than about 50%;
   wherein the primary region is substantially continuous, and the secondary region is discontinuous, and wherein the primary and secondary regions have a given surface area, and wherein the surface area of the secondary region is about 1% to about 80% of the surface area of the primary region; and
   wherein the primary region passes less than about 1% of the visibly discernible electromagnetic radiation, and the secondary region passes about 1% to about 65% of the visibly discernible electromagnetic radiation.

2. A mirror coating as claimed in claim 1, wherein the primary region is substantially continuous, and reflects less than about 80% of the visibly discernible electromagnetic radiation.

3. A mirror coating as claimed in claim 2, wherein the secondary region reflects at least about 35% of the visibly discernible electromagnetic radiation.

4. A mirror coating as claimed in claim 3, wherein the secondary region comprises a plurality of discrete apertures formed in a given pattern in the mirror coating.

5. A mirror coating as claimed in claim 4, wherein the discrete apertures have a given cross sectional area, and wherein the cumulative cross sectional areas of the given apertures comprise less than about 60% of the surface area of the secondary region.

6. A mirror coating as claimed in claim 4, wherein the discrete apertures are substantially round and have a diametral dimension of about 0.001 millimeters to about 0.015 millimeters, and wherein the apertures are spaced apart about 0.005 millimeters to about 0.050 millimeters when measured center-to-center.

7. A mirror coating as claimed in claim 5, and further comprising:
   a light emitting assembly positioned adjacent to the secondary region and which emits visible light which is passed by the secondary region, and wherein the secondary region has a luminous output of about 0.5 to about 120 candelas.

8. A mirror coating as claimed in claim 7, wherein the light emitting assembly comprises about 1 to about 30 light emitting diodes, and wherein the light emitting diodes, when energized, emit visibly discernible electromagnetic radiation, the luminous output of light emitting diodes being about 1 to about 1000 candelas.

9. A mirror coating as claimed in claim 7, wherein the light emitting assembly comprises a supporting substrate having a given light emitting surface area of about 10 to about 4000 square millimeters, and wherein about 1 to about 30 light emitting diodes are mounted on the supporting substrate, the supporting substrate and the light emitting diodes having a weight of less than about 100 grams.

10. A mirror coating as claimed in claim 7, wherein the mirror coating and the light emitting assembly comprise an optical stack which has a thickness of less than about 25 millimeters.

11. A mirror coating as claimed in claim 10, wherein the light emitting diodes emit, when energized, less than about 18 milliwatts of heat energy per square millimeter of the supporting substrate.

12. A mirror coating as claimed in claim 11, wherein the primary region of the mirror reflects less than about 80% of the visibly discernible electromagnetic radiation and is substantially opaque.

13. A mirror comprising:

a supporting substrate having opposite surfaces; and a mirror coating disposed on one of the surfaces of the substrate, and wherein the mirror coating defines a primary region which reflects less than about 80% of a given band of visibly discernible electromagnetic radiation, and a secondary region through which said electromagnetic radiation passes, and wherein the secondary region reflects at least about 35% of the same given band of visibly discernible electromagnetic radiation, wherein the average reflectance of the mirror coating is greater than about 50%.

14. A mirror as claimed in claim 13, wherein the primary region is substantially opaque, and wherein the secondary region has a given surface area which is about 1% to about 80% of the surface area of the primary region.

15. A mirror as claimed in claim 14, wherein the secondary region comprises a plurality of individual apertures having given cross sectional areas which are formed in the mirror coating, and wherein the supporting substrate is substantially transparent.

16. A mirror as claimed in claim 15, wherein the cumulative cross sectional areas of the individual apertures comprise less than about 60% of the secondary region through which visible electromagnetic radiation may pass.

17. A mirror as claimed in claim 16, wherein the secondary region passes about 1% to about 65% of the visibly discernible electromagnetic radiation.

18. A mirror as claimed in claim 17, and further comprising:

a light emitting assembly positioned adjacent to the secondary region, and which emits visible light which is passed by the secondary region of the mirror coating, and wherein the secondary region has a luminous output of about 0.5 to about 120 candelas.

19. A mirror as claimed in claim 18, wherein the secondary region passes about 1% to about 65% of the visibly discernible light emitted by the source of light, and wherein the light emitting assembly has a luminous output of about 1 to about 1000 candelas.

20. A mirror as claimed in claim 19, wherein the light emitting assembly comprises about 1 to about 30 light emitting diodes, and wherein the light emitting diodes are mounted on a supporting substrate which has a light emitting surface area of about 10 to about 4000 square millimeters, and wherein the light emitting diodes when energized emit less than about 18 milliwatts of heat energy per square millimeter of surface area.

21. A mirror as claimed in claim 20, wherein the substantially transparent substrate, mirror coating and light emitting assembly comprise an optical stack which has a thickness dimension of less than about 25 millimeters.

22. A mirror assembly comprising:

a substantially transparent substrate having opposite surfaces, and given surface area;

a mirror coating disposed on one of the surfaces of the substantially transparent substrate, and wherein the mirror coating defines a primary region which reflects less than about 80% of a given band of visibly discernible electromagnetic radiation, and a secondary region through which said electromagnetic radiation passes, and wherein the secondary region comprises about 1% to about 80% of the surface area of the substantially transparent substrate and reflects at least about 35% of the same given band of visibly discernible electromagnetic radiation, and wherein the secondary region is defined by a plurality of discreet apertures formed in the mirror coating, wherein the average reflectance of the mirror coating is greater than about 50%; and about 1 to about 30 light emitting diodes positioned adjacent to the secondary region and which, when energized, have a cumulative luminous output of about 1 to about 1000 candelas, and wherein the luminous output of the secondary region is about 0.5 to about 120 candelas.

* * * * *